(12) United States Patent
Lin

(10) Patent No.: US 11,975,818 B2
(45) Date of Patent: May 7, 2024

(54) AIRCRAFT, TAKEOFF CONTROL METHOD AND SYSTEM, AND LANDING CONTROL METHOD AND SYSTEM

(71) Applicant: SZ DJI TECHNOLOGY CO., LTD., Shenzhen (CN)

(72) Inventor: Canlong Lin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 666 days.

(21) Appl. No.: 17/037,231

(22) Filed: Sep. 29, 2020

(65) Prior Publication Data

US 2021/0009254 A1 Jan. 14, 2021

Related U.S. Application Data

(63) Continuation of application No. 15/621,682, filed on Jun. 13, 2017, now Pat. No. 10,793,258, which is a
(Continued)

(51) Int. Cl.
*B64C 13/18* (2006.01)
*B64C 39/02* (2023.01)
(Continued)

(52) U.S. Cl.
CPC ............ *B64C 13/18* (2013.01); *B64C 39/024* (2013.01); *B64D 45/04* (2013.01); *G05D 1/0676* (2013.01); *G05D 1/10* (2013.01)

(58) Field of Classification Search
CPC ....... B64C 13/18; B64C 39/024; B64D 45/04; G05D 1/0676; G05D 1/10; G05D 1/101
See application file for complete search history.

(56) References Cited

U.S. PATENT DOCUMENTS 4,633,404 A 12/1986 Greeson et al.
5,716,032 A 2/1998 McIngvale
(Continued)

FOREIGN PATENT DOCUMENTS

CN 101710243 A 5/2010
CN 101976078 A 2/2011
(Continued)

OTHER PUBLICATIONS

Yi Sun, Unmanned Aircraft System Pilot Aviation Handbook, Oct. 2014, p. 241, Civil Aviation Administration of China Press.
(Continued)

*Primary Examiner* — Jess Whittington
*Assistant Examiner* — Brian E Yang
(74) *Attorney, Agent, or Firm* — ANOVA LAW GROUP, PLLC

(57) ABSTRACT

A landing control method for an aircraft includes detecting whether a landing indication signal is received, controlling the aircraft to automatically land in a pre-set landing mode in response to the landing indication signal being received, detecting whether a landing control signal sent by a user is received, and, in response to the landing control signal sent by the user being received, modifying the pre-set landing mode according to the landing control signal to determine a modified landing mode. The landing control signal includes a first control signal for changing a pre-set attitude in the pre-set landing mode or a second control signal for changing a pre-set speed in the pre-set landing mode. The method further includes resuming the pre-set landing mode in response to the landing control signal being discontinued.

20 Claims, 20 Drawing Sheets

Related U.S. Application Data continuation of application No. PCT/CN2014/093894, filed on Dec. 15, 2014.

(51) Int. Cl.
  *B64D 45/04* (2006.01)
  *G05D 1/00* (2006.01)
  *G05D 1/06* (2006.01)
  *G05D 1/10* (2006.01)

(56) References Cited

U.S. PATENT DOCUMENTS

| | | |
|---|---|---|
| 6,785,594 B1 | 8/2004 | Bateman et al. |
| 10,077,073 B2 | 9/2018 | Allexi et al. |
| 2011/0301784 A1 | 12/2011 | Oakley et al. |
| 2012/0029869 A1 | 2/2012 | Muensterer et al. |
| 2013/0184978 A1 | 7/2013 | Subbu et al. |
| 2014/0121930 A1* | 5/2014 | Allexi .............. B60W 30/06 701/70 |
| 2014/0343765 A1 | 11/2014 | Suiter et al. |
| 2014/0350748 A1 | 11/2014 | Fisher et al. |
| 2015/0153740 A1 | 6/2015 | Ben-Shachar et al. |
| 2015/0254988 A1 | 9/2015 | Wang et al. |
| 2015/0266590 A1 | 9/2015 | Henderson |
| 2015/0291287 A1 | 10/2015 | Greene et al. |
| 2015/0323932 A1 | 11/2015 | Paduano et al. |
| 2015/0346722 A1 | 12/2015 | Herz et al. |
| 2015/0367932 A1 | 12/2015 | Patel |
| 2015/0375849 A1* | 12/2015 | Salesse-Lavergne ............. G05D 1/0858 244/17.13 |
| 2016/0012735 A1 | 1/2016 | Koukol et al. |
| 2016/0086497 A1 | 3/2016 | Williams et al. |
| 2016/0179097 A1 | 6/2016 | Chua et al. |
| 2016/0240091 A1 | 8/2016 | Thiele et al. |
| 2016/0257424 A1 | 9/2016 | Stabler et al. |
| 2017/0001732 A1 | 1/2017 | Lim |

FOREIGN PATENT DOCUMENTS

| | | |
|---|---|---|
| CN | 102298389 A | 12/2011 |
| CN | 102756808 A | 10/2012 |
| CN | 102915038 A | 2/2013 |
| CN | 103592947 A | 2/2014 |
| CN | 103754358 A | 4/2014 |
| CN | 103935508 A | 7/2014 |
| CN | 104049641 A | 9/2014 |
| GB | 1424760 A | 2/1976 |
| JP | H0575094 U | 10/1993 |
| JP | H05286497 A | 11/1993 |
| JP | H11105797 A | 4/1999 |
| JP | 2004130852 A | 4/2004 |
| JP | 2004268736 A | 9/2004 |

OTHER PUBLICATIONS

Zerong Shi et al., Airport Bird Strike Prevention and Management, Oct. 2014, p. 43-47, Hefei University of Technology Press.
The World Intellectual Property Organization (WIPO) International Search Report for PCT/CN2014/093894 dated Sep. 2, 2015 8 Pages.

* cited by examiner

AIRCRAFT, TAKEOFF CONTROL METHOD AND SYSTEM, AND LANDING CONTROL METHOD AND SYSTEM

CROSS-REFERENCE TO RELATED APPLICATIONS

This application is a continuation of application Ser. No. 15/621,682, filed on Jun. 13, 2017, which is a continuation of International Application No. PCT/CN2014/093894, filed on Dec. 15, 2014, the entire contents of both of which are incorporated herein by reference.

TECHNICAL FIELD

The present disclosure relates to the field of aircrafts, and in particular to an aircraft and a takeoff control method and system and landing control method and system thereof.

BACKGROUND

The present aircraft comprises a fixed wing aircraft and rotor aircraft with rotors enabling vertical takeoff and landing. With regard to the rotor aircraft, propellers are generally driven to rotate by corresponding motors so as to generate different pulling forces to enable the aircraft to take off, fly or land.

However, takeoff and landing operations of the aircraft may require respective execution of power output starting of the motors, i.e., a starting operation, power output stopping of the motors, i.e., a shutdown operation, and takeoff and landing preparation operations, such as the folding and unfolding of landing gear. In order to avoid the occurrence of user misoperations, some complicated operating procedures are stipulated for both takeoff and landing operations after the aircraft has landed. Therefore, the landing control method and the takeoff control method of traditional aircrafts are relatively tedious, which is inconvenient for user operations.

SUMMARY

In view of this, the present disclosure provides a landing control method and a takeoff control method.

A landing control method for an aircraft comprises:
detecting whether a landing indication signal is received; and
controlling an aircraft to automatically land in a pre-set landing mode if the landing indication signal is received.

A takeoff control method for an aircraft comprises:
detecting whether a takeoff indication signal is received; and
controlling an aircraft to automatically take off in a pre-set takeoff mode if the takeoff indication signal is received.

Meanwhile, based on the landing control method and the takeoff control method, the present disclosure further provides a landing control system and a takeoff control system.

A landing control system for an aircraft comprises:
a landing signal detection module for detecting whether a landing indication signal is received; and
an automatic landing module for controlling an aircraft to automatically land in a pre-set landing mode when the landing indication signal is received.

A takeoff control system for an aircraft comprises:
a takeoff signal detection module for detecting whether a takeoff indication signal is received; and
an automatic takeoff module for controlling an aircraft to automatically take off in a pre-set takeoff mode when the takeoff indication signal is received.

Based on the landing control method and the takeoff control method, the present disclosure further provides an aircraft applying the landing control method and the takeoff control method.

An aircraft comprises:
a signal receiver for detecting whether a landing indication signal is received; and
a controller for controlling an aircraft to automatically land in a pre-set landing mode when the landing indication signal is received.

An aircraft comprises:
a signal receiver for detecting whether a takeoff indication signal is received; and
a controller for controlling an aircraft to automatically take off in a pre-set takeoff mode when the takeoff indication signal is received.

DETAILED DESCRIPTION OF THE EMBODIMENTS

Figure 1:
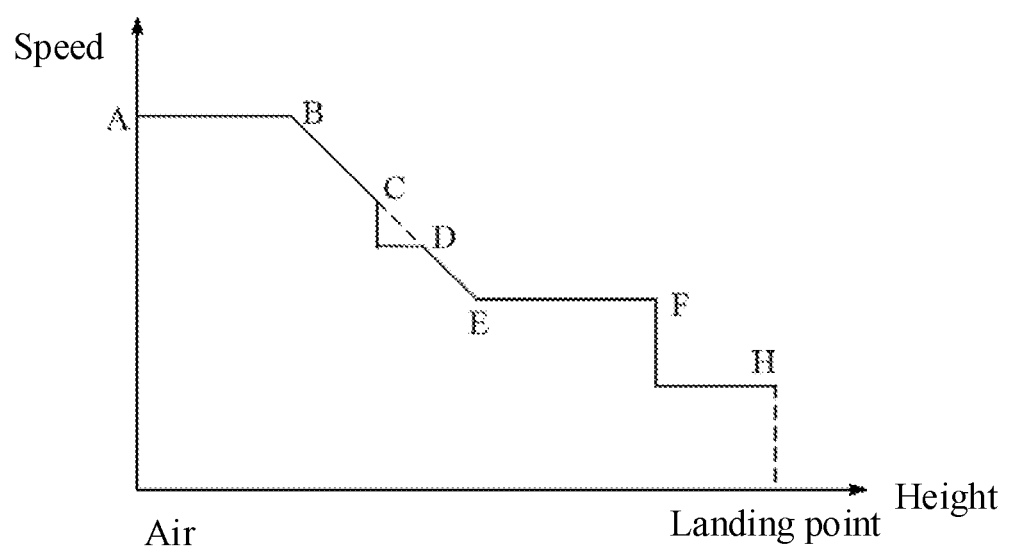
FIG. 1 is a relationship chart between the speed and height of one embodiment of a landing control method of the present disclosure.

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

The technical solutions in the embodiments of the present disclosure are hereinafter described clearly and completely with reference to the accompanying drawings. Evidently, the described embodiments are only some rather than all of the embodiments of the present disclosure. All other embodiments obtained by a person of ordinary skill in the art based on the embodiments of the present disclosure without creative efforts shall fall within the scope of the present disclosure.

Unless otherwise defined, all technical and scientific terms used herein have the same meaning as commonly understood by one of ordinary skill in the art to which this disclosure belongs. The terms used in the description of the present disclosure are for the purpose of describing particular embodiments and are not intended to limit the present disclosure. The term "and/or" used herein includes any and all combinations of one or more of the associated listed items.

The embodiments of the present disclosure provide a landing control method for an aircraft, which controls the aircraft to automatically land in a pre-set landing mode via a landing indication signal. The landing indication signal may be from a mobile terminal, such as a remote controller, a tablet computer, a cell phone, or an aircraft base station.

In some embodiments, in the pre-set landing mode, the aircraft may acquire a current vertical distance between the aircraft and a landing point in real time, and carries out a corresponding action according to the current vertical distance. For example, the corresponding action may be changing the flight speed of the aircraft, e.g. increasing a current descending speed of the aircraft, or decreasing the current descending speed of the aircraft. The corresponding action may also be changing an attitude of the aircraft. For example, the aircraft may be controlled to move forward, backward, towards the left, or towards the right. The corresponding action may also be a landing preparation action, e.g. folding a landing gear, or retracting a sensor carried by the aircraft. The corresponding action may also be recording flight information when the aircraft is landing, e.g. recording a current position of the aircraft, or capturing an image of an ambient environment of the aircraft.

In some embodiments, the landing preparation action comprises at least one of the following: changing a functional form of the aircraft; changing a functional form of a sensor of the aircraft; or changing a functional form of a payload carried by the aircraft. The functional form comprises a physical form, an electronic form, position information, etc. The physical form may be a shape change of a mechanical structure, a change of a component cooperative relationship, etc. The electronic form may be a change of an operating state, a change of an operating parameter, etc. The position information may be a relative position or an absolute position to the ground, etc.

In some embodiments, in the pre-set landing mode, a user may correct the pre-set landing mode, and the aircraft may automatically land in the corrected pre-set landing mode.

Based on the above-mentioned landing control method for an aircraft, the embodiments of the present disclosure further provide a landing control system for implementing the landing control method.

Based on the above-mentioned landing control method for an aircraft, the embodiments of the present disclosure further provide an aircraft applying the landing control method and comprising a signal receiver for detecting whether a control signal is received and a controller for controlling an aircraft to automatically land in a pre-set landing mode according to the control signal. The control signal may be a landing indication signal for indicating to an aircraft to start to land, a user landing control signal for correcting a pre-set landing mode, etc.

In some embodiments, the aircraft further comprises a height sensor for acquiring a current vertical distance between the aircraft and a landing point in real time. The height sensor may be an absolute height sensor, such as a barometer or a GPS, and according to the value of a difference between an absolute height of the landing point and the current vertical distance of the aircraft, the current vertical distance between the aircraft and the landing point may be obtained. The height sensor may also be a relative height sensor, such as an ultrasonic sensor, a binocular image sensor, or a laser distance sensor.

The embodiments of the present disclosure further provide a takeoff control method for an aircraft, which controls the aircraft to automatically take off in a pre-set takeoff mode via the takeoff indication signal. The takeoff indication signal may be from a mobile terminal, such as a remote controller, a tablet computer, a cell phone, or an aircraft base station.

In some embodiments, in the pre-set takeoff mode, a user may correct the pre-set takeoff mode, and the aircraft may automatically take off in the corrected pre-set takeoff mode.

In some embodiments, in the pre-set takeoff mode, the aircraft takes off to different pre-set heights and may automatically carry out corresponding actions corresponding to the pre-set heights. The corresponding actions may be designed according to different requirements. For example, the corresponding action may be changing the flight speed of the aircraft, e.g. increasing a current ascending speed of the aircraft, or decreasing the current ascending speed of the aircraft. The corresponding action may also be changing an attitude of the aircraft. For example, the aircraft may be controlled to move forward, backward, towards the left, or towards the right. The corresponding action may also be a post-takeoff preparation action, e.g. folding a landing gear, or extending a sensor carried by the aircraft. The corresponding action may also be recording flight information when the aircraft takes off, e.g. recording a current position of the aircraft, or capturing an image of an ambient environment of the aircraft.

In some embodiments, the post-takeoff preparation action may comprise: changing a functional form of the aircraft; changing a functional form of a sensor of the aircraft; or changing a functional form of a payload carried by the aircraft. The functional form comprises a physical form, an electronic form, position information, etc. The physical form may be a shape change of a mechanical structure, a change of a component cooperative relationship, etc. The electronic form may be a change of an operating state, a change of an operating parameter, etc. The position information may be a relative position or an absolute position to the ground, etc.

Based on the above-mentioned takeoff control method for an aircraft, the embodiments of the present disclosure further provide a takeoff control system for implementing the takeoff control method.

Based on the above-mentioned takeoff control method for an aircraft, the embodiments of the present disclosure further provide an aircraft applying the takeoff control method and comprising a signal receiver for detecting whether a control signal is received and a controller for controlling an aircraft to automatically take off in a pre-set takeoff mode according to the control signal. The control signal may be a takeoff indication signal for indicating to an aircraft to start to take off, a user takeoff control signal for correcting a pre-set takeoff mode, etc.

In some embodiments, the aircraft further comprises a height sensor for acquiring a current vertical distance between the aircraft and a takeoff point in real time. The height sensor may be an absolute height sensor, such as a barometer or a GPS, and according to the value of a difference between an absolute height of the takeoff point and the current vertical distance of the aircraft, the current vertical distance between the aircraft and the takeoff point may be obtained. The height sensor may also be a relative height sensor, such as an ultrasonic sensor, a binocular image sensor, or a laser distance sensor.

Some of the embodiments of the present disclosure are described in detail below with reference to the drawings. The embodiments below and the features in the embodiments may be combined with each other if there is no conflict.

Figure 2:
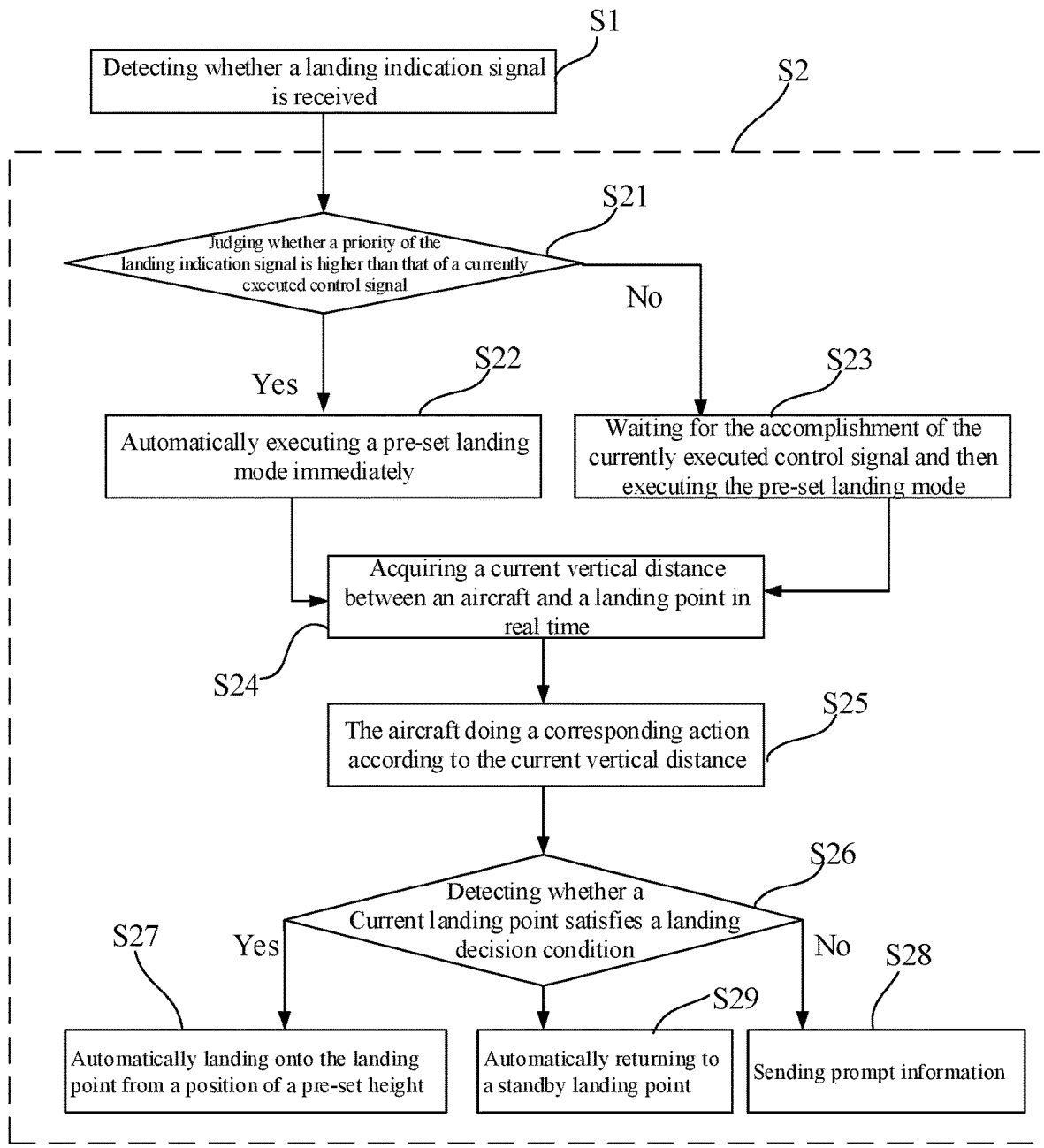
FIG. 2 is a flowchart of a landing control method of embodiment 1 of the present disclosure.

Referring to FIGS. 1 and 2, a landing control method of the embodiments of the present disclosure is used for controlling the aircraft to automatically land in a pre-set landing mode. Specifically, the landing control method comprises steps S1 and S2.

Step S1, detecting whether a landing indication signal is received is detected.

Specifically, a landing indication signal is sent by a mobile terminal. When the mobile terminal sends landing indication information, the aircraft may detect whether landing indication information sent by the mobile terminal is received.

The mobile terminal may be a remote controller, a tablet computer, a cell phone, an aircraft base station, etc. The landing indication signal may be triggered by a physical switch of the mobile terminal, e.g. by operating a "one-key-landing" key on a remote controller to control the remote controller to send the landing indication signal.

Certainly, a landing indication signal may also be triggered by a virtual switch of the mobile terminal. For example, an operation interface of the mobile terminal may be touched to control the remote controller to send the landing indication signal.

Specifically, a touch method for the mobile terminal comprises the steps of:

detecting a contact operation on a touch display of the mobile terminal;

if the detected contact operation is a sliding contact operation in a pre-set image region, then detecting whether the sliding contact operation is a control trigger operation on an aircraft; and if so, then generating a landing indication signal so as to control the aircraft.

Alternatively, the image region is a human-machine interaction interface, and the image region comprises a region for indicating a sliding path and a sliding interaction icon that may be dynamically moved in the region of the sliding path.

Alternatively, before detecting a contact operation on a touch display, the method further comprises: when a display instruction regarding the image region is received, displaying a pre-set image region.

Step S2, controlling the aircraft to automatically land in a pre-set landing mode if the landing indication signal is received.

When the aircraft receives the landing indication signal sent by the mobile terminal, the aircraft then automatically lands in the pre-set landing mode so as to achieve the purpose of aircraft automatic landing.

It shall be explained that in order to achieve the step of controlling the aircraft to automatically land in the pre-set landing mode, different embodiments may be used, and step S2 is described in detail below with reference to the drawings.

Specifically, in this embodiment, step S2 specifically comprises S21-S28.

Step S21, judging whether a priority of the landing indication signal is higher than that of a currently executed control signal.

Specifically, the aircraft receives the landing indication signal of the mobile terminal at a height position A, and at this moment, it can be determined whether to immediately execute the pre-set landing mode according to the comparison of the priority of the landing indication signal and that of the currently executed control signal of the aircraft.

The priority of the landing indication signal and that of the currently executed control signal of the aircraft may be pre-set by a flight control system of the aircraft, and may also be set by a user as required.

Step S22, if the priority of the landing indication signal is higher than that of the currently executed control signal, then immediately controlling the aircraft to automatically land in the pre-set landing mode.

When the priority of the landing indication signal is higher than that of the currently executed control signal, the aircraft immediately executes the pre-set landing mode at this moment, such that the aircraft automatically lands in the pre-set landing mode.

Step S23, if the priority of the landing indication signal is not higher than that of the currently executed control signal, then waiting for the accomplishment of the currently executed control signal and then controlling the aircraft to automatically land in the pre-set landing mode.

When the priority of the landing indication signal is not higher than that of the currently executed control signal, after the accomplishment of the currently executed control signal, the aircraft then executes a pre-set flight mode at this moment.

Step S24, acquiring a current vertical distance between the aircraft and a landing point in real time.

Specifically, in the process of descending from a height position A to a landing point H, the aircraft acquires a vertical distance between the aircraft and the landing point H in real time.

Step S25, the aircraft carrying out a corresponding action according to the current vertical distance.

The aircraft descends to different pre-set heights and may automatically carry out corresponding actions corresponding to the pre-set heights. The corresponding actions may be designed according to different requirements. For example, the corresponding action may be changing the flight speed of the aircraft, e.g. increasing a current descending speed of the aircraft, or decreasing the current descending speed of the aircraft. The corresponding action may also be changing an attitude of the aircraft. For example, the aircraft may be controlled to move forward, backward, towards the left, or towards the right. The corresponding action may also be a landing preparation action, e.g. unfolding a landing gear, or retracting a sensor carried by the aircraft. The corresponding action may also be recording flight information when the aircraft is landing, e.g. recording a current position of the aircraft, or capturing an image of an ambient environment of the aircraft.

Specifically, in this embodiment, when the landing indication signal is received, the aircraft automatically starts to carry out a landing preparation action. In other words, the height where the aircraft receives the landing indication signal is a pre-set height where the landing preparation action is carried out. Specifically, when the landing indication signal is received at a height position A, the aircraft automatically starts to carry out a landing preparation action.

Certainly, in other embodiments, after the landing indication signal is received, the aircraft then executes the pre-set flight mode. In other words, the height where the aircraft receives the landing indication signal is not a pre-set height where the landing preparation action is carried out.

Figure 3:
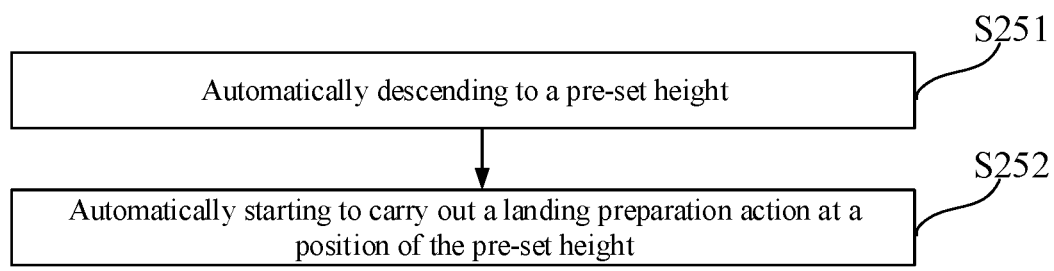
FIG. 3 is a flowchart of one embodiment of step S25 of the landing control method as shown in FIG. 2.

As shown in FIG. 3, in some embodiments, the step of the aircraft carrying out a corresponding action according to the current vertical distance may specifically comprise steps S251 and S252.

Step S251, automatically descending to a pre-set height.

For example, the aircraft may automatically descend from the height position A where the landing indication signal is received to a height position B at a constant speed. That is, the height of the height position B is a pre-set height where the landing preparation action is done.

Step S252, automatically starting to carry out a landing preparation action at a position of the pre-set height.

For example, at the height position B, the aircraft automatically starts to carry out the landing preparation action, e.g. unfolding a landing gear, turning on an ultrasonic sensor, or adjusting an attitude of a gimbal.

Figure 4:
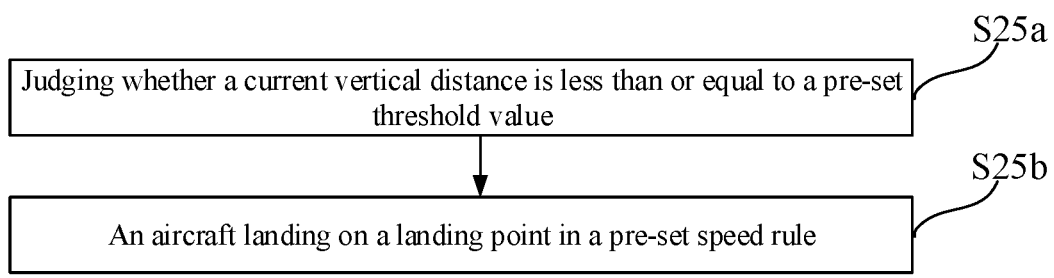
FIG. 4 is a flowchart of another embodiment of step S25 of the landing control method as shown in FIG. 2.

As shown in FIG. 4, in some embodiments, the step of the aircraft carrying out a corresponding action according to the current vertical distance may specifically comprise steps S25a and S25b.

Step S25a, judging whether the current vertical distance is less than or equal to a pre-set threshold value.

Specifically, when the aircraft descends to the height position B, it is needed to judge whether a vertical distance between the height position B and a landing point exceeds the pre-set threshold value.

Step S25b, if so, the aircraft landing on the landing point by a pre-set speed rule.

For example, when the vertical distance between the height position B and the landing point exceeds the pre-set threshold value, corresponding speed protection measures may be taken. For example, when the vertical distance between the height position B and the landing point exceeds 40 m, the aircraft may descend at a decreasing speed.

Step S26, when the aircraft descends to a position of a pre-set height, detecting whether a current landing point satisfies a landing decision condition.

Specifically, when the aircraft lands to a height position E, whether the current landing point satisfies the landing decision condition is detected. For example, when the current landing point is, for example, a water surface or an obstacle, the landing decision condition may be satisfied.

Step S27, if it is detected that the current landing point satisfies the landing decision condition, then automatically landing on the landing point from the position of the pre-set height.

Step S28, if it is detected that the current landing point does not satisfy the landing decision condition, then sending prompt information.

When it is detected that the current landing point does not satisfy the landing decision condition, the prompt information may be fed back to the user For example, the aircraft may send a light alarm or send an alarm via the mobile terminal.

Certainly, in other embodiments, step S2 further comprises step S29: if it is detected that the current landing point does not satisfy the landing decision condition, the aircraft may also automatically return to a standby landing point. The standby landing point may be a takeoff point of the aircraft, a current position of the mobile terminal, etc.

Figure 5:
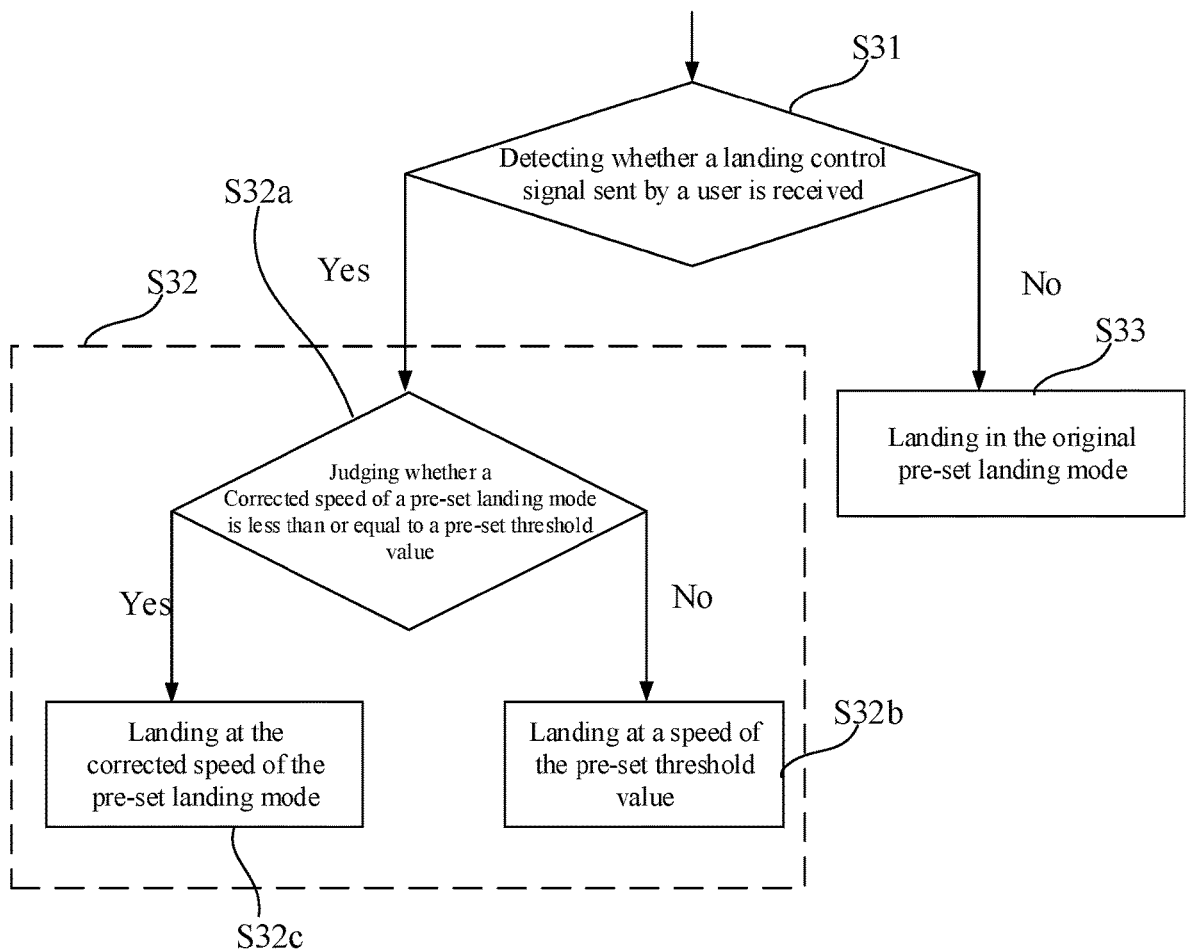
FIG. 5 is a flowchart of newly added steps of a landing control method of embodiment 2 of the present disclosure.

Referring to FIG. 5, on the basis of embodiment 1, embodiment 2 of the present disclosure further comprises steps S31-S33. Steps S31-S33 may be located between steps S23 and S26.

Step S31, detecting whether a landing control signal sent by a user is received.

The user uses the mobile terminal to send the landing control signal. The landing control signal is used for correcting the pre-set landing mode. For example, when the aircraft discovers an obstacle in the process of automatically executing the pre-set landing mode, the user may correct the pre-set landing mode via the landing control signal so as to avoid the obstacle.

In the whole process of the aircraft automatically executing the pre-set landing mode, or within a pre-set height range of the pre-set landing mode, or within a pre-set descending speed range of the pre-set landing mode, whether the landing control signal sent by the user is received is detected in real time.

Step S32, if it is detected that the landing control signal sent by the user is received, then correcting the pre-set landing mode according to the landing control signal, and landing in the corrected pre-set landing mode.

The landing control signal may comprise a control signal for changing a pre-set attitude in the pre-set landing mode. The pre-set attitude may comprise information such as a yaw angle, a pitch angle, or a roll angle of the aircraft.

The landing control signal may also comprise a control signal for changing a pre-set speed in the pre-set landing mode. For example, the corrected speed of the aircraft is equal to the superposition of a control speed of the landing control signal and the pre-set speed.

For example, in the pre-set landing mode, the aircraft automatically descends from the height position B to a height position E at a decreasing speed. However, when the aircraft descends to a height position C, the user sends a landing control signal of accelerated descending, and the landing control signal may correct the pre-set landing mode at this moment. That is, the landing control signal superposes the pre-set speeds between the height position C and a height position D, such that the aircraft descends from the height position C to the height position D at a constant speed, but descends from the height position D to the height position E at a decreasing speed.

In order to avoid user misoperations or excessive operations, speed protection measures may also be taken in step S32. Specifically, step S32 may also specifically comprise steps S32a-S32c.

Step S32a, judging whether a corrected speed of the pre-set landing mode is less than or equal to a pre-set threshold value.

Figure 6:
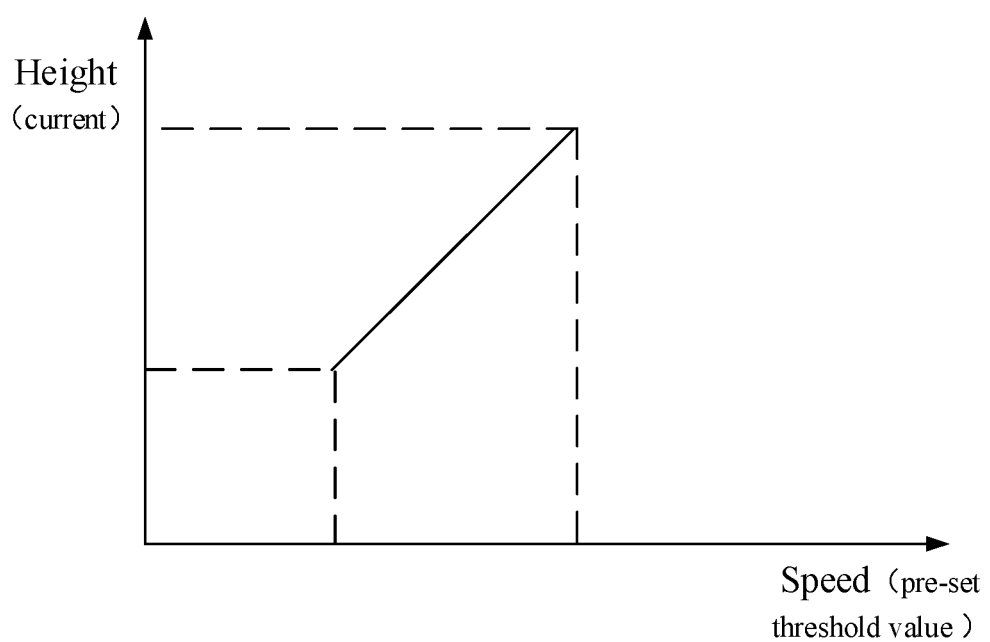
FIG. 6 is a relationship chart between a pre-set threshold value of a speed and a current height in the landing control method as shown in FIG. 5.

As shown in FIG. 6, the pre-set threshold value may be a maximum speed limit corresponding to a current vertical distance between the aircraft and a landing point.

Step S32b, if the corrected speed of the pre-set landing mode is less than or equal to the pre-set threshold value, then landing at the corrected speed of the pre-set landing mode.

Step S32c, if the corrected speed of the pre-set landing mode is greater than the pre-set threshold value, then landing at a speed of the pre-set threshold value.

Step S33, if it is detected that the landing control signal from the user is not received, then landing in the original pre-set landing mode.

In other embodiments, step S32 further comprises correcting the speed of a pre-set mode in a secure mode. For example, in the descending process, the secure mode of the speed of the aircraft is that the speed changes from +Vmax to −Vmax, and the change from +Vmax to −Vmax is mapped to the control signal correspondingly.

It shall be explained that the landing control signal may also be a control signal of exiting the pre-set landing mode, and when receiving the control signal of exiting the pre-set landing mode, the aircraft exits the pre-set landing mode at this moment.

Based on the above-mentioned landing control method, the present disclosure further provides a landing control system for an aircraft.

Figure 7:
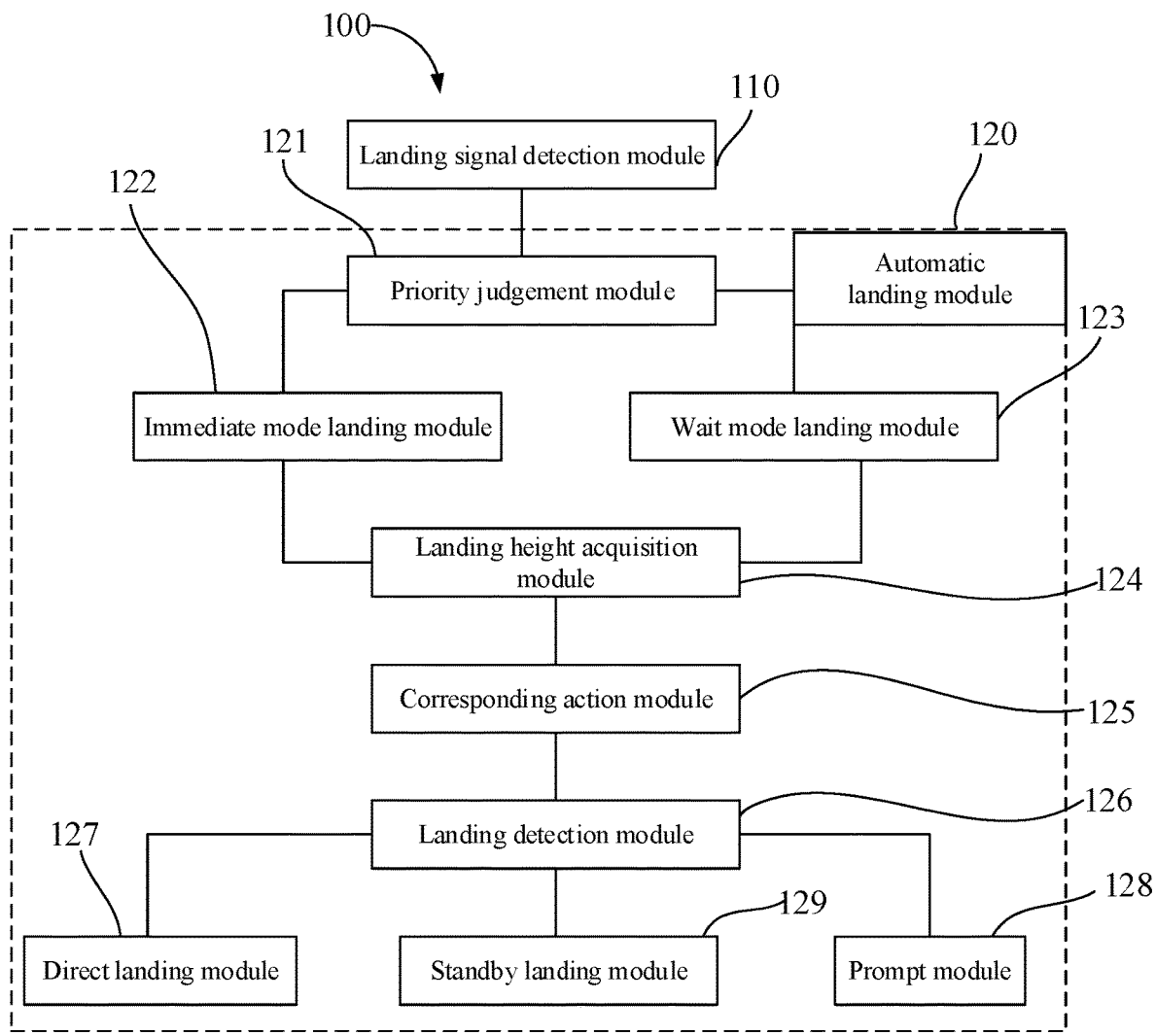
FIG. 7 is a module chart of a landing control system of embodiment 1 of the present disclosure.

Referring to FIG. 7, a landing control system 100 of embodiment 1 of the present disclosure comprises a landing signal detection module 110 and an automatic landing module 120.

The landing signal detection module 110 is used for detecting whether a landing indication signal is received. Specifically, a landing indication signal is sent by a mobile terminal. When the mobile terminal sends landing indication information, the aircraft may detect whether the landing indication information sent by the mobile terminal is received.

The mobile terminal may be a remote controller, a tablet computer, a cell phone, an aircraft base station, etc. The landing indication signal may be triggered by a physical switch of the mobile terminal, e.g., by operating a "one-key-landing" key on a remote controller to control the remote controller to send the landing indication signal.

Certainly, a landing indication signal may also be triggered by a virtual switch of the mobile terminal. For example, an operation interface of the mobile terminal may be touched to control the remote controller to send the landing indication signal.

The automatic landing module 120 is used for controlling an aircraft to automatically land in a pre-set landing mode when the landing indication signal is received. When the aircraft receives the landing indication signal sent by the mobile terminal, the aircraft then automatically lands in the pre-set landing mode so as to achieve the purpose of aircraft automatic landing.

The automatic landing module 120 may be designed according to different requirements, which will be described in detail below with reference to the drawings.

Specifically, in this embodiment, the automatic landing module 120 specifically comprises a priority judgement module 121, an immediate mode landing module 122, a wait mode landing module 123, a landing height acquisition module 124, a corresponding action module 125, a landing detection module 126, a direct landing module 127, and a prompt module 128.

The priority judgement module 121 is used for judging whether a priority of the landing indication signal is higher than that of a currently executed control signal.

The immediate mode landing module 122 is used for immediately controlling the aircraft to automatically land in the pre-set landing mode when the priority of the landing indication signal is higher than that of the currently executed control signal.

The wait mode landing module 123 is used for, when the priority of the landing indication signal is less than or equal to that of the currently executed control signal, waiting for the accomplishment of the currently executed control signal and then controlling the aircraft to automatically land in the pre-set landing mode.

The landing height acquisition module 124 is used for acquiring a current vertical distance between the aircraft and a landing point in real time.

The corresponding action module 125 is used for controlling the aircraft to carry out a corresponding action according to the current vertical distance.

At different pre-set heights, the aircraft may automatically carry out corresponding actions corresponding to the pre-set heights. The corresponding actions may be designed according to different requirements. For example, the corresponding action may be changing the flight speed of the aircraft, e.g. increasing a current descending speed of the aircraft, or decreasing the current descending speed of the aircraft. The corresponding action may also be changing an attitude of the aircraft. For example, the aircraft may be controlled to move forward, backward, towards the left, or towards the right. The corresponding action may also be a landing preparation action, e.g. unfolding a landing gear, or retracting a sensor carried by the aircraft. The corresponding action may also be recording flight information when the aircraft is landing, e.g. recording a current position of the aircraft, or capturing an image of an ambient environment of the aircraft.

The specific structure of the corresponding action module 125 may be designed according to different requirements. For example, in one embodiment, the corresponding action module 125 specifically comprises an immediate preparation action module for automatically starting to carry out a landing preparation action when the landing indication signal is received.

The landing preparation action may be changing a functional form of the aircraft, e.g. unfolding or folding a landing gear of the aircraft, or changing the shape of a structure of the aircraft. The landing preparation action may also be changing a functional form of a sensor of the aircraft, such as moving the position of the sensor, for example, by retracting the sensor from the outside of the aircraft to the inside, etc., changing an attitude of the sensor, for example, by changing a rotational angle of an image sensor, or controlling an operating state of the sensor, for example, by turning the sensor on or off. The landing preparation action may also be changing a functional form of a payload carried by the aircraft, e.g. changing an attitude of a gimbal carried by the aircraft.

Figure 8:
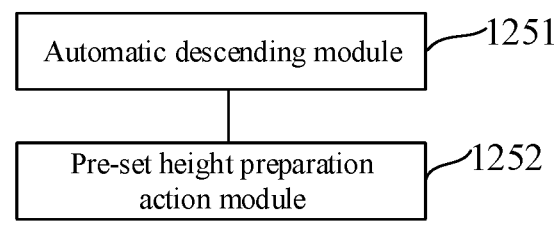
FIG. 8 is a flowchart of one embodiment of a corresponding action module of the landing control system as shown in FIG. 7.

As shown in FIG. 8, in other embodiments, the corresponding action module 125 specifically comprises an automatic descending module 1251 and a pre-set height preparation action module 1252. The automatic descending module 1251 is used for controlling the aircraft to automatically descend to a pre-set height. The pre-set height preparation action module 1252 is used for automatically starting to carry out a landing preparation action at a position of the pre-set height.

Figure 9:
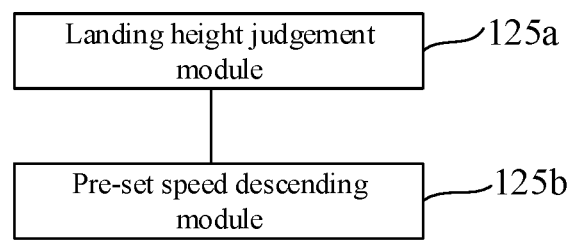
FIG. 9 is a module chart of another embodiment of a corresponding action module of the landing control system as shown in FIG. 7.

As shown in FIG. 9, in other embodiments, the corresponding action module 125 specifically comprises a landing height judgement module 125a and a pre-set speed descending module 125b. The landing height judgement module 125a is used for judging whether the current vertical distance is less than or equal to a pre-set threshold value. The pre-set speed descending module 125b is used for controlling the aircraft to land on a landing point by a pre-set speed rule when the current vertical distance is less than or equal to the pre-set threshold value.

The landing detection module 126 is used for detecting whether a current landing point satisfies a landing decision condition when the aircraft descends to a position of a pre-set height.

The direct landing module 127 is used for automatically landing on the landing point from the position of a pre-set height when the current landing point satisfies the landing decision condition.

The prompt module 128 is used for sending prompt information when the current landing point does not satisfy the landing decision condition.

In other embodiments, the landing control system 100 further comprises a standby landing module 129. The standby landing module 129 is used for controlling the aircraft to automatically return to a standby landing point. The standby landing point comprises at least one of the following: a takeoff point of the aircraft, or a current position of a mobile terminal.

Figure 10:
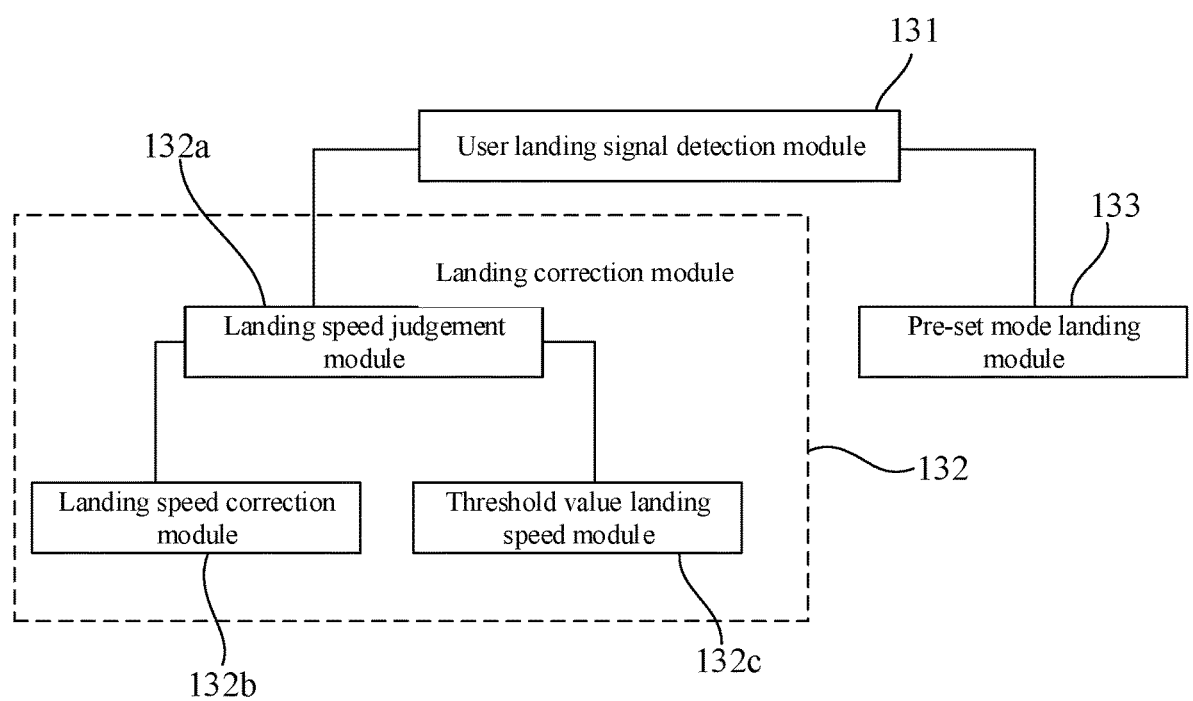
FIG. 10 is a module chart of newly added modules of a landing control system of embodiment 2 of the present disclosure.

Referring to FIG. 10, the automatic landing module 120 of embodiment 2 of the present disclosure is basically similar to embodiment 1, and the difference is that the automatic landing module 120 further comprises a user landing signal detection module 131, a landing correction module 132, and a pre-set mode landing module 133.

The user landing signal detection module 131 is used for detecting whether a landing control signal sent by a user is received. The landing control signal comprises at least one of the following: a control signal for changing a pre-set attitude in the pre-set landing mode, or a control signal for changing a pre-set speed in the pre-set landing mode.

The landing correction module 132 is used for, when the landing control signal sent by the user is received, correcting the pre-set landing mode according to the landing control signal, and landing in the corrected pre-set landing mode.

Specifically, the landing correction module 132 specifically comprises a landing speed judgement module 132a, a landing speed correction module 132b, and a threshold value landing speed module 132c.

The landing speed judgement module 132a is used for judging whether a corrected speed of the pre-set landing mode is less than or equal to a pre-set threshold value.

The landing speed correction module 132b is used for landing at the corrected speed of the pre-set landing mode when the corrected speed of the pre-set landing mode is less than or equal to the pre-set threshold value.

The threshold value landing speed module 132c is used for landing at a speed of the pre-set threshold value when the corrected speed of the pre-set landing mode is greater than the pre-set threshold value.

The pre-set mode landing module 133 is used for landing in the original pre-set landing mode when the landing control signal sent by the user is not received.

Based on the above-mentioned landing control method, the present disclosure further provides an aircraft applying the landing control method.

Figure 11:
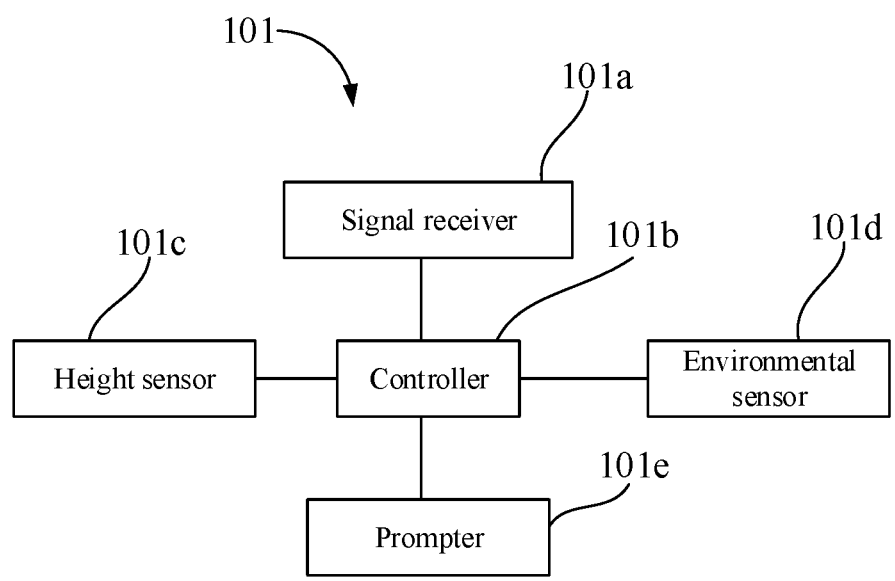
FIG. 11 is a schematic circuit diagram of an aircraft applying the above-mentioned landing control method.

Referring to FIG. 11, an aircraft 101 of the embodiments of the present disclosure comprises a signal receiver 101a for detecting whether a landing indication signal is received and a controller 101b for controlling the aircraft 101 to automatically land in a pre-set landing mode when the landing indication signal is received.

The signal receiver 101a may be an antenna apparatus, such as a WiFi antenna, a WiMAX antenna, or a COFDM antenna.

Specifically, a landing indication signal is sent by a mobile terminal. When the mobile terminal sends landing indication information, the signal receiver 101a may detect whether the landing indication information sent by the mobile terminal is received.

The mobile terminal may be a remote controller, a tablet computer, a cell phone, an aircraft base station, etc. The landing indication signal may be triggered by a physical switch of the mobile terminal, e.g. by operating a "one-key-landing" key on a remote controller to control the remote controller to send the landing indication signal.

Certainly, the landing indication signal may also be triggered by a virtual switch of the mobile terminal. For example, an operation interface of the mobile terminal may be touched to control the remote controller to send the landing indication signal.

The controller 101b may be a control circuit board, a control chip, etc. The functions of the controller 101b may be designed according to different requirements.

The controller 101b is used for judging whether a priority of the landing indication signal is higher than that of a currently executed control signal, and immediately controlling the aircraft 101 to automatically land in the pre-set landing mode when the priority of the landing indication signal is higher than that of the currently executed control signal.

Furthermore, the controller 101b is further used for controlling the aircraft 101 to, when the priority of the landing indication signal is not higher than that of the currently executed control signal, wait for the accomplishment of the currently executed control signal and automatically land in the pre-set landing mode.

In order to achieve that the controller 101b controls the aircraft 101 to land in the pre-set landing mode, different specific embodiments below are used to describe the controller 101b.

In one embodiment, the aircraft 101 further comprises a height sensor 101c for acquiring a current vertical distance between the aircraft 101 and a landing point in real time. The controller 101b is further used for controlling the aircraft 101 to carry out a corresponding action according to the current vertical distance.

At different pre-set heights, the aircraft 101 may automatically carry out corresponding actions corresponding to the pre-set heights. The corresponding actions may be designed according to different requirements. For example, the corresponding action may be changing the flight speed of the aircraft 101, e.g. increasing a current descending speed of the aircraft 101, or decreasing the current descending speed of the aircraft 101. The corresponding action may also be changing an attitude of the aircraft 101. For example, the aircraft 101 may be controlled to move forward, backward, towards the left, or towards the right. The corresponding action may also be a landing preparation action, e.g. unfolding a landing gear, or retracting a sensor carried by the aircraft 101. The corresponding action may also be recording flight information when the aircraft 101 is landing, e.g. recording a current position of the aircraft 101, or capturing an image of an ambient environment of the aircraft 101.

The controller 101b may control the aircraft 101 to carry out the landing preparation action at different moments For example, when the landing indication signal is received, the controller 101b may control the aircraft 101 to automatically start to carry out the landing preparation action. Alternatively, the controller 101b may control the aircraft 101 to automatically descend to a pre-set height and automatically start to carry out a landing preparation action at a position of the pre-set height.

The landing preparation action may be changing a functional form of the aircraft 101, e.g. unfolding or folding a landing gear of the aircraft 101, or changing the shape of a structure of the aircraft 101. The landing preparation action may also be changing a functional form of a sensor of the aircraft 101, such as moving the position of the sensor, for example, by retracting the sensor from the outside of the aircraft 101 to the inside, etc., changing an attitude of the sensor, for example, by changing the height of an image sensor with respect to the aircraft 101, or controlling an operating state of the sensor, for example, by turning the sensor on or off. The landing preparation action may also be changing a functional form of a payload carried by the aircraft 101, e.g. changing an attitude of a gimbal carried by the aircraft 101.

The controller 101b may also control the aircraft 101, at a pre-set height, to descend at a pre-set speed. For example, the controller 101b is further used for controlling the aircraft 101 to land on the landing point by a pre-set speed rule when the current vertical distance is less than or equal to the pre-set threshold value.

Furthermore, the aircraft 101 further comprises an environmental sensor 101d for detecting whether a current landing point satisfies a landing decision condition The controller 101b is further used for controlling the aircraft 101 to, when it is detected that the current landing point satisfies the landing decision condition at a position of a pre-set height, automatically land on the landing point from the position of the pre-set height.

Furthermore, the aircraft 101 further comprises a prompter 101e for sending prompt information that the current landing point does not satisfy the landing decision condition, and the controller 101b is further used for controlling the prompter 101e to send prompt information when it is detected that the current landing point does not satisfy the landing decision condition when the aircraft 101 is at the position of the pre-set height. The prompter 101e may be an apparatus such as an indicator light, a loudspeaker, etc.

Alternatively, the controller 101b is further used for controlling the aircraft 101 to automatically return to a standby landing point when it is detected that the current landing point does not satisfy the landing decision condition at the position of the pre-set height. The standby landing point may be a takeoff point of the aircraft 101, a current position of the mobile terminal, etc.

In other embodiments, the signal receiver 101a is further used for detecting whether a landing control signal sent by a user is received. The controller 101b is further used for correcting the pre-set landing mode according to the landing control signal, and controlling the aircraft 101 to land in the corrected pre-set landing mode. The landing control signal comprises at least one of the following: a control signal for changing a pre-set attitude in the pre-set landing mode, or a control signal for changing a pre-set speed in the pre-set landing mode.

Furthermore, the aircraft 101 further comprises a height sensor 101c for acquiring a current vertical distance between the aircraft 101 and a landing point in real time. The controller 101b is further used for controlling the aircraft 101 to land at the corrected speed of the pre-set landing mode when the corrected speed of the pre-set landing mode is less than or equal to the pre-set threshold value.

Furthermore, the controller 101b is further used for controlling the aircraft 101 to land at a speed of the pre-set threshold value when the corrected speed of the pre-set landing mode is greater than the pre-set threshold value.

Furthermore, the controller 101b is further used for controlling the aircraft 101 to land in the original pre-set landing mode when the landing control signal sent by the user is not received.

Figure 13:
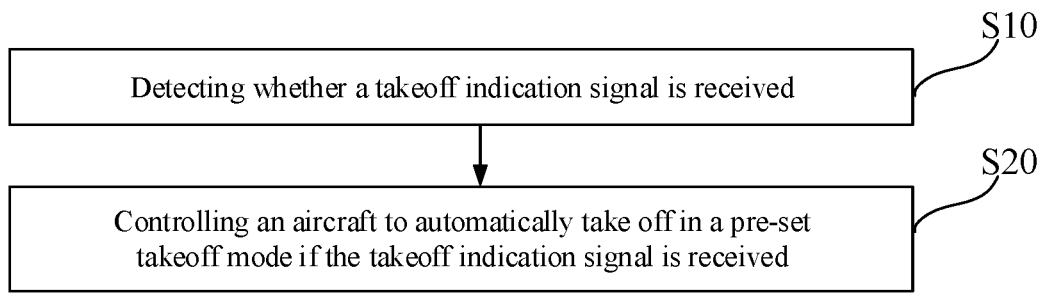
FIG. 13 is a flowchart of a takeoff control method of embodiment 1 of the present disclosure.

Referring to FIG. 13, the takeoff control method for an aircraft of embodiment 1 of the present disclosure comprises steps S10 and S20.

Step S10, detecting whether a takeoff indication signal is received.

Specifically, a takeoff indication signal is sent by a mobile terminal. When the mobile terminal sends takeoff indication information, the aircraft may detect whether takeoff indication information sent by the mobile terminal is received.

The mobile terminal may be a remote controller, a tablet computer, a cell phone, an aircraft base station, etc. The takeoff indication signal may be triggered by a physical switch of the mobile terminal, e.g. by operating a "one-key-takeoff" key on a remote controller to control the remote controller to send the takeoff indication signal.

Certainly, a takeoff indication signal may also be triggered by a virtual switch of the mobile terminal. For example, an operation interface of the mobile terminal may be touched to control the remote controller to send the takeoff indication signal.

Specifically, a touch method for the mobile terminal comprises the steps of:

detecting a contact operation on a touch display of the mobile terminal;

if the detected contact operation is a sliding contact operation in a pre-set image region, then detecting whether the sliding contact operation is a control trigger operation on an aircraft; and if so, then generating a takeoff indication signal so as to control the aircraft.

Alternatively, the image region is a human-machine interaction interface, and the image region comprises a region for indicating a sliding path and a sliding interaction icon that may be dynamically moved in the region of the sliding path.

Alternatively, before detecting a contact operation on a touch display, the method further comprises: displaying a pre-set image region when a display instruction regarding the image region is received.

Step S20, controlling an aircraft to automatically take off in a pre-set takeoff mode if the takeoff indication signal is received.

Figure 12:
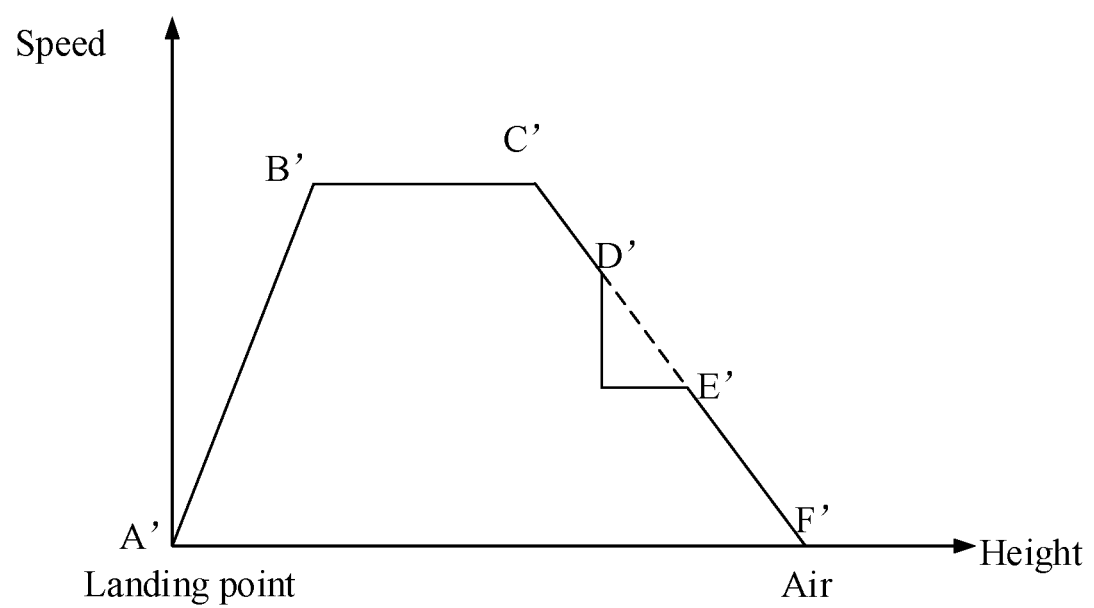
FIG. 12 is a relationship chart between speed and height of one embodiment of a takeoff control method of the present disclosure.
Figure 14:
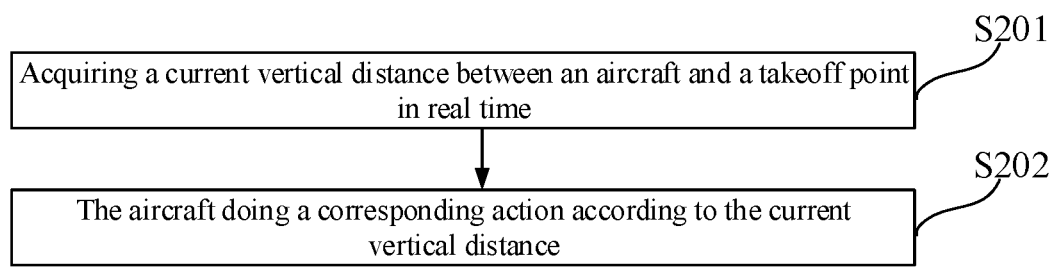
FIG. 14 is a flowchart of one embodiment of step S20 of the takeoff control method as shown in FIG. 13.

Referring to FIGS. 12 and 14, specifically, in this embodiment, the step of controlling an aircraft to automatically take off in a pre-set takeoff mode specifically comprises steps S201 and S202.

Step S201, acquiring a current vertical distance between the aircraft and a takeoff point in real time.

Specifically, in the process of ascending from a takeoff point A' to a height position F', the aircraft acquires a vertical distance between the aircraft and the takeoff point A' in real time.

Step S202, the aircraft carrying out a corresponding action according to the current vertical distance.

The aircraft takes off to different pre-set heights and may automatically carry out corresponding actions corresponding to the pre-set heights. The corresponding actions may be designed according to different requirements. For example, the corresponding action may be changing the flight speed of the aircraft, e.g. increasing a current ascending speed of the aircraft, or decreasing the current ascending speed of the aircraft. The corresponding action may also be changing an attitude of the aircraft. For example, the aircraft may be controlled to move forward, backward, towards the left, or towards the right. The corresponding action may also be a post-takeoff preparation action, e.g. folding a landing gear, extending a sensor carried by the aircraft, etc. The corresponding action may also be recording flight information when the aircraft takes off, e.g. recording a current position of the aircraft, capturing an image of an ambient environment of the aircraft, etc.

Figure 15:
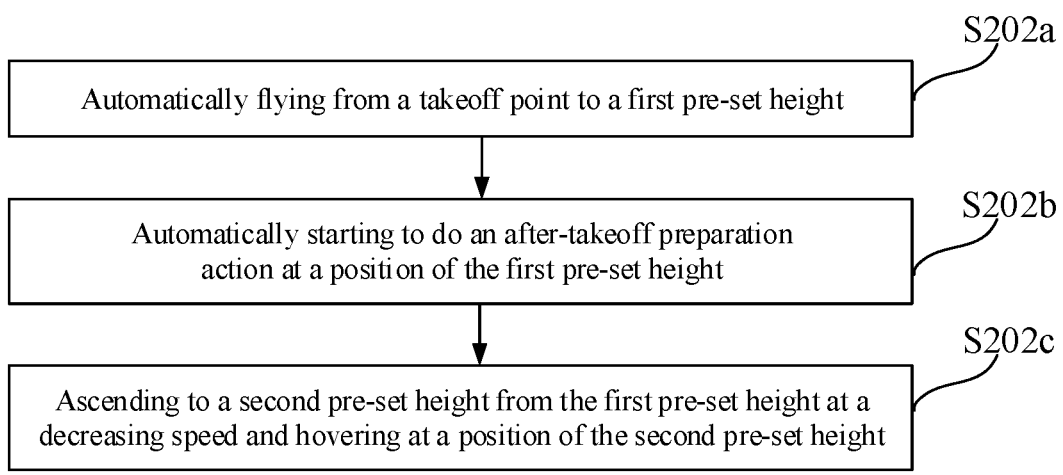
FIG. 15 is a flowchart of another embodiment of step S202 of the takeoff control method as shown in FIG. 14.

Referring to FIG. 15, specifically, the step of the aircraft doing a corresponding action according to the current vertical distance specifically comprises steps S202a-S202c.

Step S202a, automatically flying from a takeoff point to a first pre-set height.

Specifically, the aircraft ascending from a takeoff point A' to a height position C'.

Step S202b, automatically starting to carry out a post-takeoff preparation action at a position of the first pre-set height.

The post-takeoff preparation action may be changing a functional form of the aircraft, e.g. unfolding or folding a landing gear of the aircraft, changing the shape of a structure of the aircraft, etc. The post-takeoff preparation action may also be changing a functional form of a sensor of the aircraft, such as moving the position of the sensor, for example, by extending the sensor from the inside of the aircraft to the outside, etc., changing an attitude of the sensor, for example, by changing a rotational angle of an image sensor, etc., or controlling an operating state of the sensor, for example, by turning the sensor on or off, etc. The post-takeoff preparation action may also be changing a functional form of a payload carried by the aircraft, e.g. changing an attitude of a gimbal carried by the aircraft, etc.

For example, at the height position C', the aircraft automatically starts to retract a landing gear.

Step S202c, ascending to a second pre-set height from the first pre-set height at a gradually decreasing speed and hovering at a position of the second pre-set height.

For example, the aircraft gradually slows down from the height position C' of the takeoff point to a height position F' and hovers at the height position F'.

Figure 16:
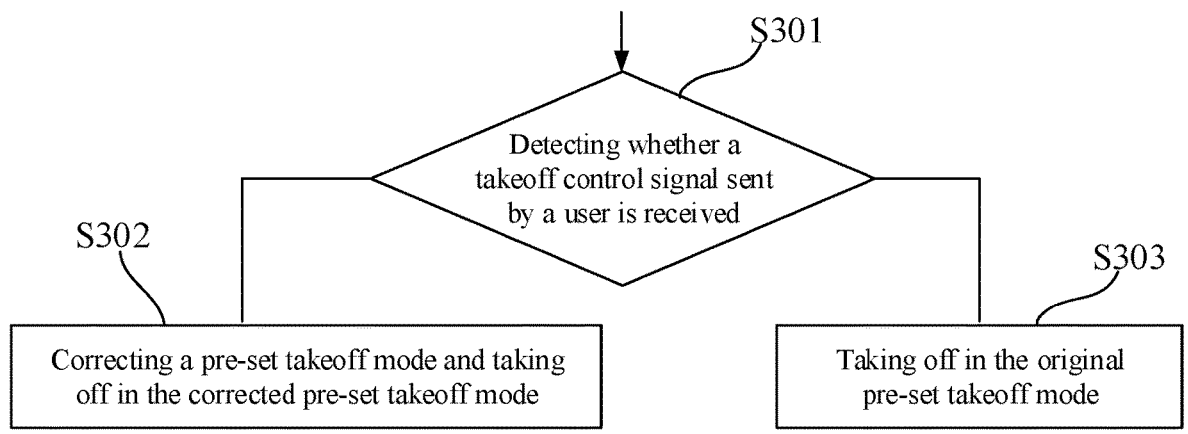
FIG. 16 is a flowchart of newly added steps of a takeoff control method of embodiment 2 of the present disclosure.

Meanwhile, referring to FIG. 16, on the basis of embodiment 1, the takeoff control method of embodiment 2 of the present disclosure further comprises steps S301-S303.

Step S301, detecting whether a takeoff control signal sent by a user is received.

The user uses the mobile terminal to send the takeoff control signal. The takeoff control signal is used for correcting the pre-set takeoff mode. For example, when the aircraft discovers an obstacle in the process of automatically executing the pre-set takeoff mode, the user may correct the pre-set takeoff mode via the takeoff control signal so as to avoid the obstacle.

In the whole process of the aircraft automatically executing the pre-set takeoff mode, or within a pre-set height range of the pre-set takeoff mode, or within a pre-set ascending speed range of the pre-set takeoff mode, whether the takeoff control signal sent by the user is received is detected in real time.

For example, in the process where the aircraft ascends from the height position C' to the height position F', whether the takeoff control signal sent by the user is received is detected in real time.

Step S302, if the takeoff control signal sent by the user is received, then correcting the pre-set takeoff mode according to the takeoff control signal, and taking off in the corrected pre-set takeoff mode.

The takeoff control signal may comprise a control signal for changing a pre-set attitude in the pre-set takeoff mode. The pre-set attitude may comprise information such as a yaw angle, a pitch angle, or a roll angle of the aircraft.

The takeoff control signal may also comprise a control signal for changing a pre-set speed in the pre-set takeoff mode. For example, the corrected speed of the aircraft is equal to the superposition of a control speed of the takeoff control signal and the pre-set speed.

For example, in the pre-set takeoff mode, the aircraft automatically ascends from the height position C' to the height position F' at a decreasing speed. However, when the aircraft ascends to a height position D', the user sends a takeoff control signal of ascending at a decreasing speed, and the takeoff control signal may correct the pre-set takeoff mode at this moment. That is, the takeoff control signal superposes the pre-set speeds between the height position D' and a height position E', such that the aircraft ascends from the height position D' to the height position E' at a constant speed.

Step S303, if the takeoff control signal sent by the user is not received, then taking off in the original pre-set takeoff mode.

It shall be explained that the takeoff control signal may also be a control signal of exiting the pre-set takeoff mode, and when receiving the control signal of exiting the pre-set takeoff mode, the aircraft exits the pre-set takeoff mode at this moment.

Based on the above-mentioned takeoff control method for an aircraft, the present disclosure further provides a takeoff control system for an aircraft.

Figure 17:
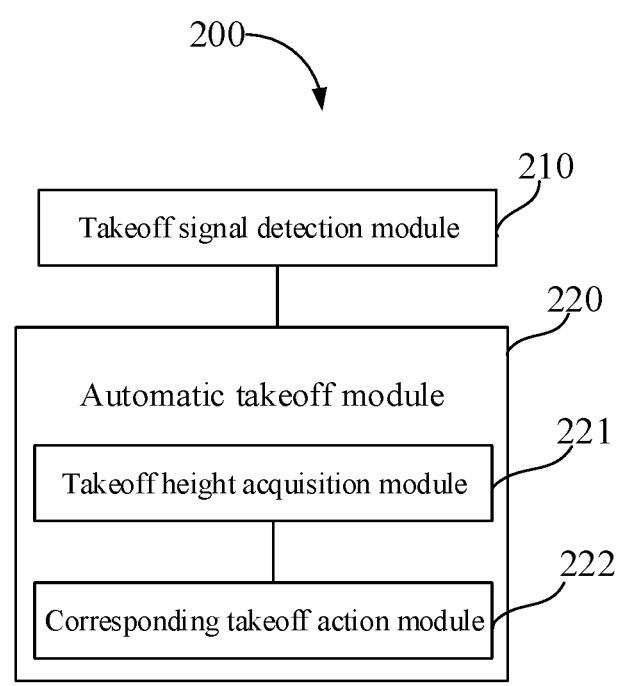
FIG. 17 is a module chart of a takeoff control system of embodiment 1 of the present disclosure.

Referring to FIG. 17, a takeoff control system 200 for an aircraft of embodiment 1 of the present disclosure comprises a takeoff signal detection module 210 and an automatic takeoff module 220.

The takeoff signal detection module 210 is used for detecting whether a takeoff indication signal is received.

Specifically, the takeoff indication signal is sent by a mobile terminal. When the mobile terminal sends takeoff indication information, the aircraft may detect whether the takeoff indication information sent by the mobile terminal is received.

The mobile terminal may be a remote controller, a tablet computer, a cell phone, an aircraft base station, etc. The takeoff indication signal may be triggered by a physical switch of the mobile terminal, e.g. by operating a "one-key-takeoff" key on a remote controller to control the remote controller to send the takeoff indication signal.

Certainly, the takeoff indication signal may also be triggered by a virtual switch of the mobile terminal. For example, an operation interface of the mobile terminal may be touched to control the remote controller to send the takeoff indication signal.

The automatic takeoff module 220 is used for controlling an aircraft to automatically take off in a pre-set takeoff mode when the takeoff indication signal is received.

Specifically, in this embodiment, the automatic takeoff module 220 specifically comprises a takeoff height acquisition module 221 and a corresponding takeoff action module 222.

The takeoff height acquisition module 221 is used for acquiring a current vertical distance between the aircraft and a takeoff point in real time.

The corresponding takeoff action module 222 is used for controlling the aircraft to carry out a corresponding action according to the current vertical distance.

The aircraft takes off to different pre-set heights and may automatically carry out corresponding actions corresponding to the pre-set heights. The corresponding actions may be designed according to different requirements. For example, the corresponding action may be changing the flight speed of the aircraft, e.g. increasing a current ascending speed of the aircraft, or decreasing the current ascending speed of the aircraft. The corresponding action may also be changing an attitude of the aircraft. For example, the aircraft may be controlled to move forward, backward, towards the left, or towards the right. The corresponding action may also be a post-takeoff preparation action, e.g. folding a landing gear, or extending a sensor carried by the aircraft. The corresponding action may also be recording flight information when the aircraft takes off, e.g. recording a current position of the aircraft, or capturing an image of an ambient environment of the aircraft.

Figure 18:
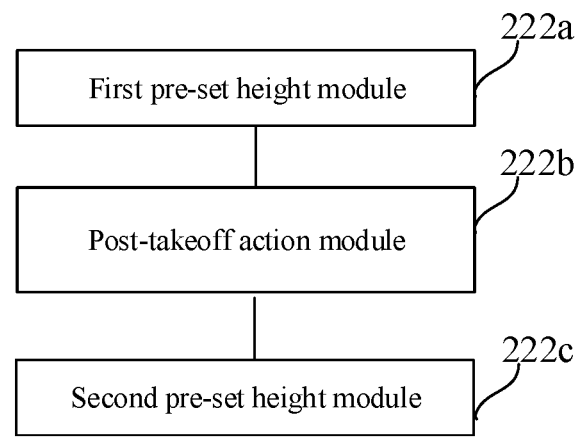
FIG. 18 is a module chart of a corresponding takeoff action module of the takeoff control system as shown in FIG. 17.

As shown in FIG. 18, specifically, the corresponding takeoff action module 222 comprises a first pre-set height module 222a, a post-takeoff action module 222b, and a second pre-set height module 222c. The first pre-set height module 222a is used for controlling the aircraft to automatically fly from a takeoff point to a first pre-set height. The post-takeoff action module 222b is used for automatically starting to carry out a post-takeoff preparation action at a position of the first pre-set height.

The post-takeoff preparation action may be changing a functional form of the aircraft, e.g. unfolding or folding a landing gear of the aircraft, or changing the shape of a structure of the aircraft. The post-takeoff preparation action may also be changing a functional form of a sensor of the aircraft, such as moving the position of the sensor, for example, by extending the sensor from the inside of the aircraft to the outside, etc., changing an attitude of the sensor, for example, by changing a rotational angle of an image sensor, or controlling an operating state of the sensor, for example, by turning the sensor on or off. The post-takeoff preparation action may also be changing a functional form of a payload carried by the aircraft, e.g. changing an attitude of a gimbal carried by the aircraft.

The second pre-set height module 222c is used for controlling the aircraft to ascend to a second pre-set height from the first pre-set height at a gradually decreasing speed and hover at a position of the second pre-set height.

Figure 19:
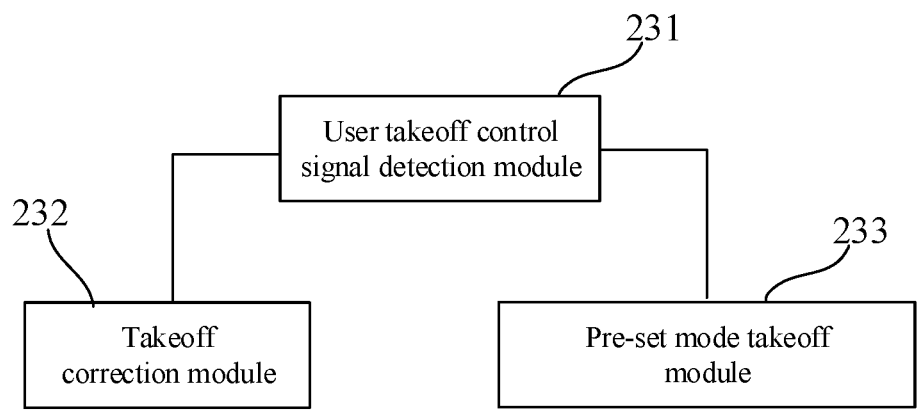
FIG. 19 is a module chart of newly added modules of a takeoff control system of embodiment 2 of the present disclosure.

As shown in FIG. 19, on the basis of embodiment 1, the takeoff control system of embodiment 2 of the present disclosure further comprises a user takeoff control signal detection module 231, a takeoff correction module 232, and a pre-set mode takeoff module 233.

The user takeoff control signal detection module 231 is used for detecting whether a takeoff control signal sent by a user is received. The user uses the mobile terminal to send the takeoff control signal. The takeoff control signal is used for correcting the pre-set takeoff mode. For example, when the aircraft discovers an obstacle in the process of automatically executing the pre-set takeoff mode, the user may correct the pre-set takeoff mode via the takeoff control signal so as to avoid the obstacle.

In the whole process of the aircraft automatically executing the pre-set takeoff mode, or within a pre-set height range of the pre-set takeoff mode, or within a pre-set ascending speed range of the pre-set takeoff mode, the user takeoff control signal detection module 231 starts to detect whether the takeoff control signal sent by the user is received in real time.

The takeoff correction module 232 is used for, when the takeoff control signal sent by the user is received, correcting the pre-set takeoff mode according to the takeoff control signal, and taking off in the corrected pre-set takeoff mode.

The takeoff control signal may comprise a control signal for changing a pre-set attitude in the pre-set takeoff mode. The pre-set attitude may comprise information such as a yaw angle, a pitch angle, or a roll angle of the aircraft.

The takeoff control signal may also comprise a control signal for changing a pre-set speed in the pre-set takeoff mode. For example, the corrected speed of the aircraft is equal to the superposition of a control speed of the takeoff control signal and the pre-set speed.

The pre-set mode takeoff module 233 is used for taking off in the original pre-set takeoff mode when the takeoff control signal sent by the user is not received.

Based on the above-mentioned takeoff control method, the present disclosure further provides an aircraft applying the takeoff control method.

Figure 20:
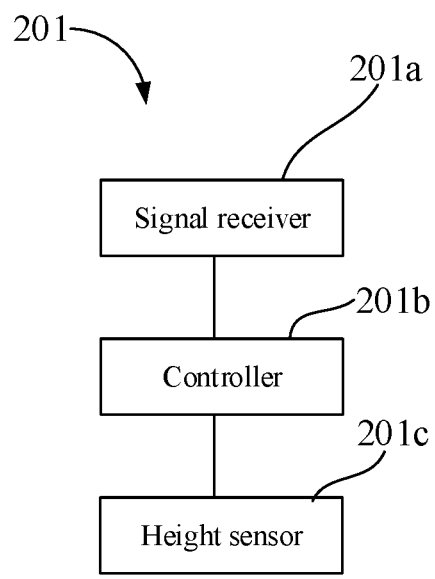
FIG. 20 is a schematic circuit diagram of an aircraft applying the above-mentioned takeoff control method.

Referring to FIG. 20, an aircraft 201 of the embodiments of the present disclosure comprises a signal receiver 201a for detecting whether a takeoff indication signal is received and a controller 201b for controlling the aircraft 201 to automatically take off in a pre-set takeoff mode when the takeoff indication signal is received.

Specifically, in this embodiment, the aircraft 201 further comprises a height sensor 201c for acquiring a current vertical distance between the aircraft 201 and a takeoff point in real time. The controller 201b is further used for controlling the aircraft 201 to carry out a corresponding action according to the current vertical distance.

The aircraft 201 takes off to different pre-set heights and may automatically carry out corresponding actions corresponding to the pre-set heights. The corresponding actions may be designed according to different requirements. For example, the corresponding action may be changing a flight speed of the aircraft 201, e.g. increasing a current ascending speed of the aircraft 201, or decreasing the current ascending speed of the aircraft 201. The corresponding action may also be changing an attitude of the aircraft 201. For example, the aircraft 201 may be controlled to move forward, backward, towards the left, or towards the right. The corresponding action may also be a post-takeoff preparation action, e.g. unfolding a landing gear, or extending a sensor carried by the aircraft 201. The corresponding action may also be recording flight information when the aircraft 201 takes off, e.g. recording a current position of the aircraft 201, or capturing an image of an ambient environment of the aircraft 201.

For example, the controller 201b is used for controlling the aircraft 201 to automatically fly from a takeoff point to a first pre-set height, and automatically start to carry out a post-takeoff preparation action at a position of the first pre-set height.

Furthermore, the controller 201b is further used for controlling the aircraft 201 to ascend to a second pre-set height from the first pre-set height at a gradually decreasing speed and hover at a position of the second pre-set height.

The post-takeoff preparation action may be changing a functional form of the aircraft 201, e.g. unfolding or folding a landing gear of the aircraft 201, or changing the shape of a structure of the aircraft 201. The post-takeoff preparation action may also be changing a functional form of a sensor of the aircraft 201, such as moving the position of the sensor, for example, by extending the sensor from the inside of the aircraft 201 to the outside, etc., changing an attitude of the sensor, for example, by changing the height of an image sensor with respect to the aircraft 201, or controlling an operating state of the sensor, for example, by turning the sensor on or off. The post-takeoff preparation action may also be changing a functional form of a payload carried by the aircraft 201, e.g. changing an attitude of a gimbal carried by the aircraft 201.

In other embodiments, the signal receiver 201a is further used for detecting whether a takeoff control signal sent by a user is received. The controller 201b is used for correcting the pre-set takeoff mode according to the takeoff control signal, and controlling the aircraft 201 to take off in the corrected pre-set takeoff mode.

Furthermore, the controller 201b is further used for controlling the aircraft 201 to take off in the original pre-set takeoff mode when the takeoff control signal sent by the user is not received.

The user uses the mobile terminal to send the takeoff control signal. The takeoff control signal is used for correcting the pre-set takeoff mode. For example, when the aircraft 201 discovers an obstacle in the process of automatically executing the pre-set takeoff mode, the user may correct the pre-set takeoff mode via the takeoff control signal so as to avoid the obstacle.

In the whole process of the aircraft 201 automatically executing the pre-set takeoff mode, or within a pre-set height range of the pre-set takeoff mode, or within a pre-set ascending speed range of the pre-set takeoff mode, whether the takeoff control signal sent by the user is received is detected in real time.

The takeoff control signal may comprise a control signal for changing a pre-set attitude in the pre-set takeoff mode. The pre-set attitude may comprise information such as a yaw angle, a pitch angle, or a roll angle of the aircraft 201.

The takeoff control signal may also comprise a control signal for changing a pre-set speed in the pre-set takeoff mode. For example, the corrected speed of the aircraft 201 is equal to the superposition of a control speed of the takeoff control signal and the pre-set speed.

In the several embodiments provided in the present disclosure, it should be understood that the disclosed relevant apparatus and method may be implemented in other manners. For example, the apparatus embodiments described above are merely illustrative. For example, the division of modules or units is merely a logical function division, and there may be other division methods in actual implementation. For example, a plurality of units or components may be combined or may be integrated into another system, or some features may be omitted or not be executed. In another aspect, the coupling, direct coupling, or communicative connection therebetween which is displayed or discussed may be indirect coupling or a communicative connection of interfaces, apparatuses or units, and may be electrical, mechanical or in other forms.

The units described as separate parts may or may not be physically separate, and parts displayed as units may or may not be physical units, that is, may be located in one place, or may also be distributed on multiple network elements. Some or all of the units may be selected according to actual needs to achieve the objectives of the solutions of the embodiments.

In addition, various functional units in various embodiments of the present disclosure may be integrated into one processing unit, or each of the units may exist alone physically, or two or more units may be integrated into a unit. The integrated unit may be implemented in the form of hardware, or may be implemented in the form of a software functional unit.

When the integrated unit are implemented in the form of a software functional unit and sold or used as an independent product, the integrated unit may be stored in a computer-readable storage medium. Based on this understanding, embodiments of the present disclosure may be embodied in a form of a computer software product, and the computer software product is stored in a storage medium, comprising various instructions for causing a computer processor to execute all or some of the steps of the method of individual embodiments of the present disclosure. The foregoing storage medium comprises: any medium that is capable of storing program codes, such as a U-disk, a portable hard disk, a read-only memory (ROM), a random access memory (RAM), a magnetic disk or an optical disk.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A landing control method for an aircraft, comprising:
   detecting whether a landing indication signal is received;
   controlling the aircraft to automatically land in a pre-set landing mode in response to the landing indication signal being received;
   detecting whether a landing control signal sent by a user is received;
   in response to the landing control signal sent by the user being received, modifying the pre-set landing mode according to the landing control signal to determine a modified landing mode, wherein the landing control signal comprises a control signal for changing a pre-set speed in the pre-set landing mode; and
   resuming the pre-set landing mode in response to the landing control signal being discontinued;
   wherein modifying the pre-set landing mode according to the landing control signal comprises:
      changing the pre-set speed in the pre-set landing mode to a modified speed, the modified speed being equal to a superposition of a control speed of the landing control signal and the pre-set speed.

2. The landing control method according to claim 1, wherein controlling the aircraft to automatically land in the pre-set landing mode further comprises:
   automatically descending to a pre-set height; and
   automatically starting a landing preparation action at a position of the pre-set height.

3. The landing control method according to claim 2, wherein starting the landing preparation action further comprises:
   changing a functional form of the aircraft.

4. The landing control method according to claim 3, wherein changing the functional form of the aircraft further comprises unfolding a landing gear of the aircraft.

5. The landing control method according to claim 2, wherein starting the landing preparation action further comprises changing a functional form of a sensor of the aircraft.

6. The landing control method according to claim 5, wherein changing the functional form of the sensor further comprises changing a position of the sensor.

7. The landing control method according to claim 2, wherein starting the landing preparation action further comprises changing a functional form of a payload carried by the aircraft.

8. The landing control method according to claim 1, wherein controlling the aircraft to automatically land in the pre-set landing mode further comprises:
- acquiring a current vertical distance between the aircraft and a landing point;
- judging whether the current vertical distance is shorter than or equal to a pre-set threshold value; and
- in response to the current vertical distance being shorter than or equal to the pre-set threshold value, landing the aircraft on the landing point according to a pre-set speed rule.

9. The landing control method according to claim 1, wherein controlling the aircraft to automatically land in the pre-set landing mode in response to the landing indication signal being received further comprises:
- acquiring a current vertical distance between the aircraft and a landing point; and
- controlling the aircraft to carry out a corresponding action according to the current vertical distance.

10. The landing control method according to claim 9, wherein controlling the aircraft to carry out the corresponding action further comprises controlling the aircraft to carry out at least one of:
- changing a flight speed of the aircraft;
- changing an attitude of the aircraft;
- performing a landing preparation action; or
- recording flight information when the aircraft is landing.

11. The landing control method according to claim 1, wherein controlling the aircraft to automatically land in the pre-set landing mode in response to the landing indication signal being received further comprises:
- judging whether a priority of the landing indication signal is higher than a priority of a currently executed control signal; and
- in response to the priority of the landing indication signal being higher than the priority of the currently executed control signal, immediately controlling the aircraft to automatically land in the pre-set landing mode.

12. The landing control method according to claim 11, wherein controlling the aircraft to automatically land in the pre-set landing mode in response to the landing indication signal being received further comprises:
- in response to the priority of the landing indication signal not being higher than the priority of the currently executed control signal, waiting for the currently executed control signal to complete and then controlling the aircraft to automatically land in the pre-set landing mode.

13. The landing control method according to claim 1, wherein controlling the aircraft to automatically land in the pre-set landing mode in response to the landing indication signal being received further comprises:
- detecting whether a current landing point satisfies a landing decision condition when the aircraft descends to a position of a pre-set height; and
- in response to the current landing point satisfying the landing decision condition when the aircraft descends to the position of the pre-set height, automatically landing on the current landing point from the position of the pre-set height.

14. The landing control method according to claim 13, wherein controlling the aircraft to automatically land in the pre-set landing mode in response to the landing indication signal being received further comprises:
- in response to the current landing point not satisfying the landing decision condition when the aircraft descends to the position of the pre-set height, sending prompt information.

15. The landing control method according to claim 13, wherein controlling the aircraft to automatically land in the pre-set landing mode in response to the landing indication signal being received further comprises:
- in response to the current landing point not satisfying the landing decision condition when the aircraft descends to the position of the pre-set height, controlling the aircraft to automatically return to a standby landing point.

16. The landing control method according to claim 15, wherein controlling the aircraft to automatically return to the standby landing point further comprises:
- controlling the aircraft to automatically return to at least one of a takeoff point of the aircraft or a current position of a mobile terminal.

17. The landing control method according to claim 1, wherein modifying the pre-set landing mode according to the landing control signal further comprises:
- judging whether a modified speed of the modified landing mode is lower than or equal to a pre-set speed threshold;
- in response to the modified speed being lower than or equal to the pre-set speed threshold, landing at the modified speed; and
- in response to the modified speed being higher than the pre-set speed threshold, landing at a speed of the pre-set speed threshold.

18. The landing control method according to claim 1,
wherein controlling the aircraft to automatically land in a pre-set landing mode further comprises:
- automatically descending to a pre-set height according to the pre-set landing mode; and
- automatically starting a landing preparation action at a position of the pre-set height, comprising changing a functional form of a payload carried by the aircraft.

19. The landing control method according to claim 18, wherein changing the functional form of the payload further comprises changing an attitude of a gimbal carried by the aircraft.

20. A landing control method for an aircraft, comprising:
- detecting whether a landing indication signal is received;
- controlling the aircraft to automatically land in a pre-set landing mode in response to the landing indication signal being received;
- detecting whether a landing control signal sent by a user is received; and
- in response to the landing control signal sent by the user being received, modifying the pre-set landing mode according to the landing control signal to determine a modified landing mode;
- wherein modifying the pre-set landing mode according to the landing control signal comprises:

changing a pre-set speed in the pre-set landing mode to a modified speed, the modified speed being equal to a superposition of a control speed of the landing control signal and the pre-set speed.

\* \* \* \* \*